United States Patent [19]
Thioux et al.

[11] Patent Number: 5,186,523
[45] Date of Patent: Feb. 16, 1993

[54] BRAKE COMPENSATOR FOR A MOTOR VEHICLE

[75] Inventors: Alain Thioux, Bry sur Marne; Roland Levrai, Stains, both of France

[73] Assignee: Bendix Europe Services Techniques, Drancy, France

[21] Appl. No.: 819,681

[22] Filed: Jan. 13, 1992

[30] Foreign Application Priority Data

Feb. 7, 1991 [FR] France .................... 91 01361

[51] Int. Cl.⁵ .................... B60T 11/34; B60T 15/20
[52] U.S. Cl. .................... 303/9.63; 188/349; 303/9.71; 303/9.75
[58] Field of Search ............ 303/9.63, 9.71, 9.72, 303/9.75, 84.1, 84.2, 22.1, 22.8, 22.7, 24.1, 9.69, 9.67, 9.68, 9.61, 9.64, 9.66, 9.65, 9.73, 9.74, 113 AP; 188/349, 151 A, 345; 60/591, 582

[56] References Cited

U.S. PATENT DOCUMENTS

| | | | |
|---|---|---|---|
| 3,147,046 | 9/1964 | Stelzer | 60/591 X |
| 3,163,473 | 12/1964 | Stelzer | 60/591 X |
| 3,525,552 | 8/1970 | Oberthür | 60/591 X |
| 3,545,814 | 12/1970 | Margetts | 303/9.71 |
| 3,804,468 | 4/1974 | Ishikawa et al. | 303/6 |
| 4,085,978 | 4/1978 | Nogami | 303/9.71 |
| 4,159,855 | 7/1979 | Falk | 303/24 |
| 4,217,004 | 8/1980 | Kawaguchi | 303/9.71 |
| 4,252,379 | 2/1981 | Falk | 303/9.63 |
| 4,647,114 | 3/1987 | Schuett et al. | 303/9.63 X |

FOREIGN PATENT DOCUMENTS

| | | |
|---|---|---|
| 2507323 | 8/1975 | Fed. Rep. of Germany ..... 303/9.63 |
| 2815336 | 5/1979 | Fed. Rep. of Germany . |
| 2244654 | 4/1975 | France . |
| 0008476 | 1/1978 | Japan ............................ 303/9.63 |
| 2018921 | 10/1979 | United Kingdom . |
| 2024356 | 1/1980 | United Kingdom . |

*Primary Examiner*—Douglas C. Butler
*Attorney, Agent, or Firm*—Larry J. Palguta; Ken C. Decker

[57] ABSTRACT

The invention relates to a brake compensator for a hydraulic braking circuit comprising a master cylinder (10) with two working chambers respectively connected to a subcircuit (I, II), the compensator being arranged in a subcircuit (I) comprising a first piston (22) carrying a valve mechanism (24) arranged in a communication between a working chamber of the master cylinder (10) and at least one rear wheel (16) in such a way that, in the rest position, this communication is open, and a second piston (42) subjected to the pressure prevailing in the other subcircuit (II) so as to lock the first piston (22) in the rest position in the event of the absence of a substantial pressure in the other subcircuit (II). According to the invention, a ball (32) is arranged at rest on the path of the first piston (22) in order to prevent it substantially from sliding, and a displacement of the second piston (42) under the effect of a sufficient pressure prevailing in the other subcircuit (II) removes the ball at least partially from the path.

7 Claims, 1 Drawing Sheet

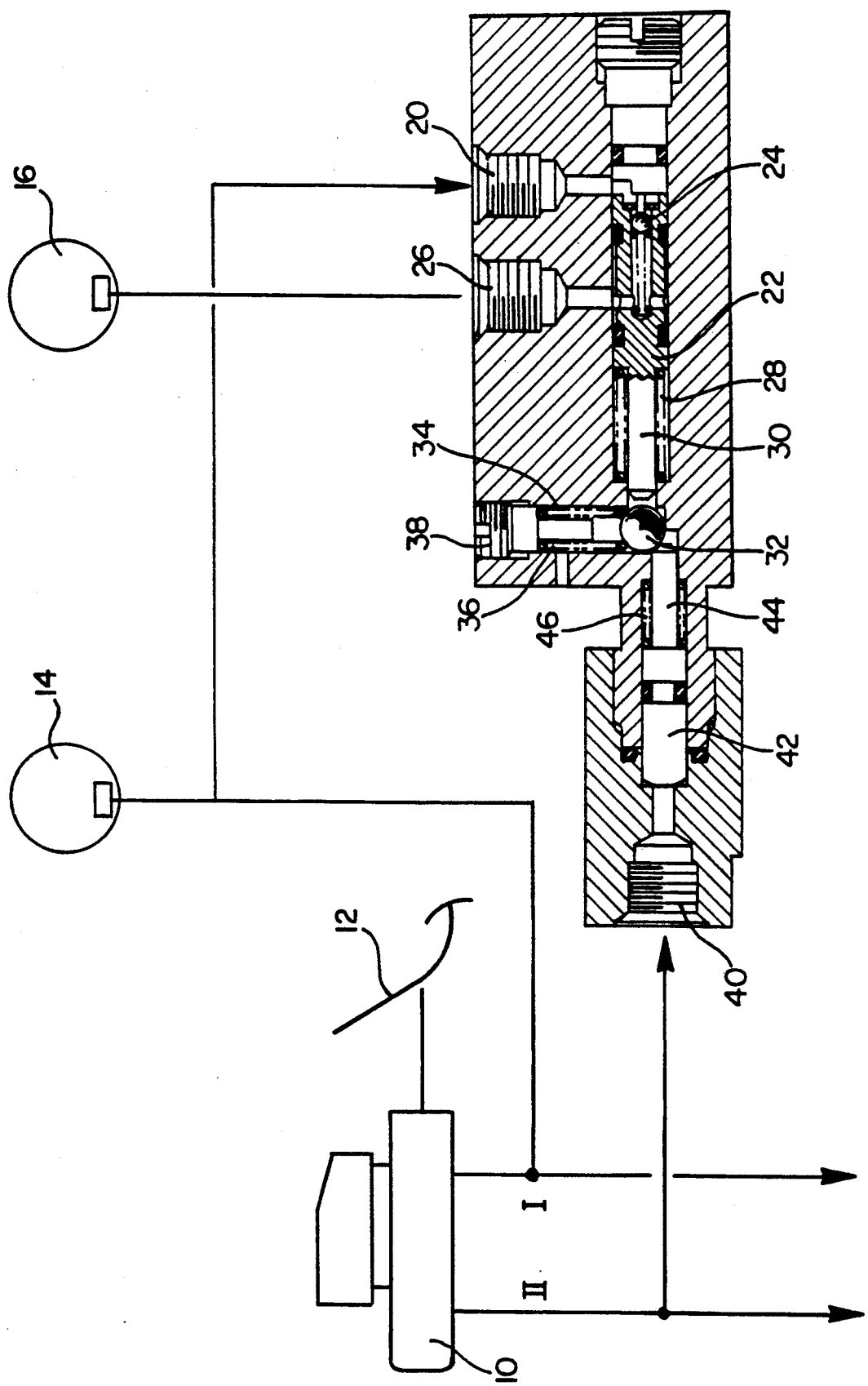

BRAKE COMPENSATOR FOR A MOTOR VEHICLE

The present invention relates to a brake for a hydraulic circuit comprising a master cylinder with two working chambers respectively connected to a subcircuit, intended to equip a motor vehicle.

It is known that a compensator plays the essential role of reducing the pressure of the brake fluid in the brake motors of the rear wheels relative to that prevailing in the corresponding working chamber of the master cylinder as soon as this pressure reaches a determined threshold.

It is, however, desirable that, in the event of failure of a subcircuit, this reduction in pressure does not take place in the other subcircuit so as to obtain the maximum braking possible in spite of the failure.

Document U.S. Pat. No. 4,217,004 describes a compensator which is inhibited as soon as the other subcircuit fails. To this end, this compensator of the prior art employs a second piston arranged perpendicularly to the axis of the first piston carrying the valve of the compensator. This second piston is subjected to the pressure prevailing in the other subcircuit and constitutes a key for locking the first piston in the open position of the valve of the compensator as long as the pressure in the other subcircuit has not exceeded a threshold determined by the stiffness of a return spring of the key.

This compensator has a risk of jamming in one or other position of the valve if the variation in the pressure in one subcircuit is more rapid than in the other subcircuit. This risk is, of course, prejudicial to safety and is not acceptable. Furthermore, the key is awkward and expensive to produce.

The object of the present invention is to overcome these disadvantages.

Its subject is therefore a brake compensator for a hydraulic braking circuit comprising a master cylinder with two working chambers respectively connected to a subcircuit, the compensator being arranged in a subcircuit and comprising a first piston carrying a valve means arranged in a communication between a working chamber of the master cylinder and at least one rear wheel in such a way that, in the rest position, this communication is open, and a second piston subjected to the pressure prevailing in the other subcircuit so as to lock the first piston in the rest position in the event of the absence of a substantial pressure in the other subcircuit.

According to the invention, a ball is arranged at rest on the path of the first piston in order to prevent it substantially from sliding, and a displacement of the second piston under the effect of a sufficient pressure prevailing in the other subcircuit removes the ball at least partially from this path.

The present invention will now be described by way of example with reference to the accompanying drawing, in which:

The single FIGURE shows diagrammatically, in section, a compensator according to the present invention.

Referring now to this Single FIGURE, a master cylinder 10 controlled by a pedal 12 determines, with its two working chambers (not shown), two subcircuits I, II which are commonly termed the primary and secondary circuits.

In the example illustrated, the secondary circuit II is shown only partially and the primary circuit I is shown more completely as supplying a brake motor of a front wheel 14 and a brake motor of a rear wheel 16 via the compensator. The invention applies, of course, to other types of hydraulic circuit, for example a circuit in which the brake motors of the two front wheels are supplied by the primary circuit, and those of the two rear wheels by the secondary circuit via the compensator.

In a conventional manner, the pressure to be reduced is applied by way of the operating inlet 20 of the compensator to a piston 22 carrying a valve 24 controlling a communication between the inlet 20 and the outlet 26 of the compensator, which outlet is connected to the brake motor of the associated wheel 16.

When at rest or under low pressure, the valve 24 is open, ensuring the abovementioned communication, whereas under elevated pressure this piston 22, termed first piston, is displaced in order to ensure the closing of the valve 24 and to interrupt the abovementioned communication. A return spring 28 ensures the return of the first piston 22 into the rest position and determines the cut-off point of the compensator.

The first piston 22 is extended by an extension of finger 30 opposite which a ball 32 is arranged. This ball 32, made from incompressible material, can move in a bore 34, for example perpendicular to the axis of the first piston 22, and is loaded by a return spring 36 maintaining it in the rest position in the axis of the finger 30.

The force exerted by this return spring 36 can advantageously be adjusted by means of a screw 38 closing the bore 34.

The pressure prevailing in the secondary circuit II is applied, via the control inlet 40 of the compensator, to a second piston 42 which is likewise extended by a finger 44 opposite the ball 32 but offset axially with respect to the latter. A return spring 46 ensures the return of the second piston 42 into the rest position.

In the example shown, the axes of the first and second pistons 22, 42 are parallel and slightly offset.

Seals are provided on each of the pistons 22, 42 and the bore 34 is connected to the open air in accordance with regulations and in order to permit the displacement of the pistons 22, 44 and of the ball 32.

The mode of operation of the compensator is as follows. When the secondary circuit II is not faulty, the pressures generated in the primary circuit I and secondary circuit II when the pedal 12 is actuated are applied respectively to the first piston 22 and the second piston 42.

The second piston 42 is displaced counter to the return spring 46 and the finger 44, slightly offset with respect to the ball, lifts the ball 32 from its rest position counter to its return spring 36. When the finger 30 of the first piston 22 comes into contact with the ball 32, it continues to lift the latter and can therefore be displaced until the valve 24 is closed. The compensator then works normally.

However, in the event of failure of the secondary circuit II, the second piston 42 is not displaced at all, and the ball 32 remains at rest opposite the finger 30 of the first piston. When the pressure in the primary circuit I rises, the first piston 22 slides in its bore counter to the spring 28, and the finger 30 comes into contact with the ball 32. Since the latter has not been lifted up beforehand, it blocks any subsequent movement of the first piston tending to close the valve 24 which, consequently, remains open.

In order to aid the displacement of the ball 32, the fingers 30 and 44 advantageously have one end of a substantially conical (or frustoconical) shape in order to be able to interact with the ball 32.

The axes of the various bores and components described above can, of course, form any angles whatsoever.

Although only one embodiment of the invention has been described, it is clear that various modifications can be made to it without going beyond the scope defined by the attached claims. For example, the compensator proper, or first piston 22, can form part of a wider assembly such as a load-controlled brake compensator or one controlled by the acceleration of the vehicle thus equipped. The pressure applied at the inlet 20 of the system does not necessarily issue directly from the master cylinder but can be modified beforehand.

We claim:

1. In a hydraulic braking circuit comprising:
   a master cylinder having first and second working chambers,
   first and second sub-circuits connected respectively to said first and second working chambers so as to receive respective first and second pressures,
   a front wheel brake connected to said first sub-circuit,
   a rear wheel brake, and
   a brake compensator comprising an operating inlet connected to said first subs-circuit, a control inlet connected to said second sub-circuit, and an outlet connected to said rear wheel brake, said brake compensator further comprising:
      a first piston slidingly movable against an elastic force and between rest and active positions under the effect of said first pressure, said first piston when in said rest and active positions causing pressures communicated to said rear wheel brake to be respectively equal to and less than said first pressure,
      pressure sensitive clearance means comprising a second piston slidingly movable between rest and clearance positions under the effect of said second pressure,
      and a ball having a position controlled by the position of said second piston and movable between corresponding rest and clearance positions, said ball when in said corresponding rest position preventing said first piston from reaching said active position.

2. The brake compensator according to claim 1, wherein said ball is biased by a spring urging the ball toward said corresponding rest position.

3. The brake compensator according to claim 2, wherein said spring is prestressed via an adjustable screw.

4. The brake compensator according to claim 2, wherein said ball and said second piston are movable along mutually perpendicular axes.

5. The brake compensator according to claim 2, wherein said ball and said first piston are movable along mutually perpendicular axes.

6. The brake compensator according to claim 2, wherein said first piston moves said ball toward a further clearance position when the first piston is moved by said first pressure toward the active position and said ball is in said corresponding clearance position.

7. The brake compensator according to claim 2, wherein at least one of said first and second pistons includes a extension provided with one of a substantially conical and frustoconical shape.

* * * * *